Dec. 21, 1926.
C. L. SHEPPY
1,611,247
ATTACHING MEANS FOR WINDSHIELD SUPPORTS AND THE LIKE
Filed Dec. 6, 1924
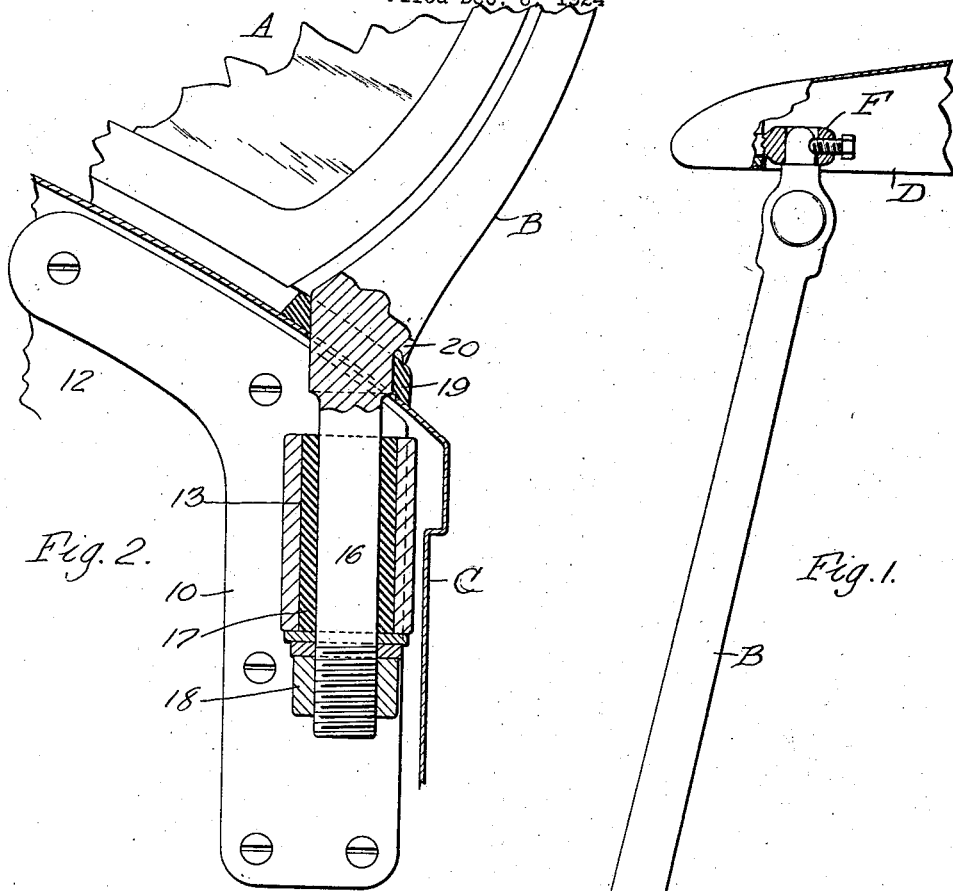
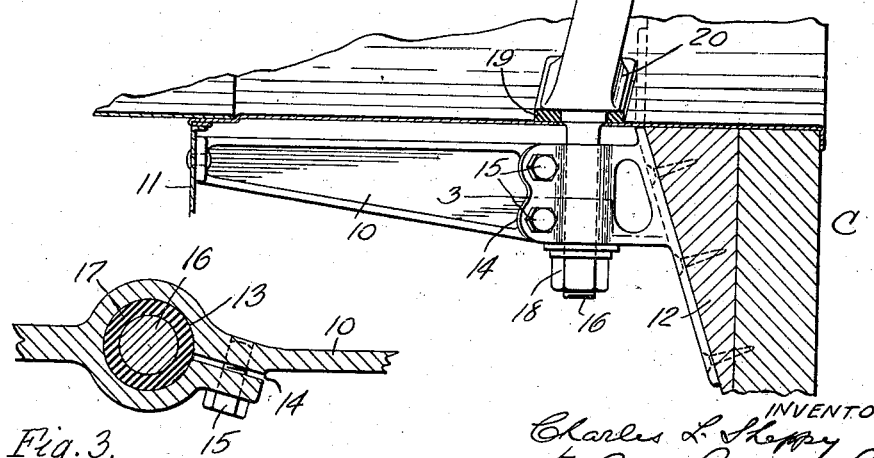
INVENTOR.
Charles L. Sheppy
by Parker, Mucheron & Bean
ATTORNEYS.

Patented Dec. 21, 1926.

1,611,247

UNITED STATES PATENT OFFICE.

CHARLES L. SHEPPY, OF BUFFALO, NEW YORK, ASSIGNOR TO THE PIERCE-ARROW MOTOR CAR COMPANY, OF BUFFALO, NEW YORK.

ATTACHING MEANS FOR WINDSHIELD SUPPORTS AND THE LIKE.

Application filed December 6, 1924. Serial No. 754,290.

The glass windshields of automobiles are commonly mounted between upright side supports or parts to which the frames of the glass windshields are pivoted or otherwise adjustably or stationarily connected. These side supports are secured at their lower ends in suitable brackets, sockets or to other attaching parts on the body of the automobile, and ordinarily, the side supports are fastened at their upper ends to the front end of the folding or permanent top of the vehicle, in order both to support and secure the front end of the top and also to brace or steady the windshield. This arrangement imposes very severe stresses upon the fastening or securing means by which the lower ends of the windshield side supports are attached to the body of the vehicle, and as a consequence, the lower ends of the side supports or posts, which in many constructions are reduced in section, or their supporting brackets or sockets in which they are rigidly fitted and secured, frequently break.

The object of this invention is to provide means of simple and practical construction for securing the lower ends of the windshield side supports or posts to the body of the vehicle and which will hold the side supports securely and firmly in place, but nevertheless will allow sufficient flexibility in the connections to prevent the breaking of the side supports, or the sockets or brackets in which they are secured at their lower ends.

In the accompanying drawings:

Fig. 1 is a fragmentary longitudinal sectional elevation of an automobile provided with securing means embodying the invention for the windshield support.

Fig. 2 is a fragmentary transverse sectional elevation thereof.

Fig. 3 is a sectional view on line 3—3, Fig. 1.

A, Fig. 2 indicates a portion of one end of a glass windshield, B one of the upright side posts or supports for the windshield, C a portion of the cowl of the automobile body, and D the front end portion of the vehicle top. The windshield shown has a curved lower edge to conform to the transverse curvature of the top of the cowl, and the end or side edge of the windshield is also curved, the side post or support B being correspondingly curved or bowed laterally outward. The invention, however, is not restricted in application to a windshield or body of this formation, but is applicable also to windshields and bodies of other forms. It will be understood that two of the side supports or posts B are provided, the same being, as usual, disposed at opposite ends of the windshield, but only one side support is shown in the drawings. As usual, these side supports B are firmly secured at their lower ends to the body of the vehicle, and preferably are also removably fastened by a screw clamp or fastening device F of any suitable construction, to the front end of the vehicle top. In the constructions heretofore commonly employed, the lower ends of the side posts are tightly fitted and rigidly secured in sockets, brackets or other securing parts attached to the body of the automobile.

10 represents a securing bracket, one of which is employed for each windshield side post B. In the construction shown, this bracket extends horizontally lengthwise of the vehicle and is fastened by screws, bolts or other fastenings at its front and rear ends to the front and rear walls or portions 11 and 12 respectively of the cowl or dash of the automobile. The bracket, however, can be of other construction and can be secured in any other suitable way to the vehicle. The bracket is provided with a socket or hole 13 and is split as shown at 14 Fig. 3, to intersect said hole, and the parts of the bracket at opposite sides of the split 14 are connected by screws, bolts or other devices 15, by means of which the socket or hole can be contracted. The side post B is provided at its lower end with a cylindrical shank 16 which enters and is secured in the socket or hole 13 of the bracket 10. The shank 16 is of smaller diameter than the internal diameter of the hole 13, and a sleeve or bushing 17 of rubber or other suitable resilient or compressible material surrounds the shank 16 in the hole 13 of the bracket. This sleeve 17 is preferably substantially the same length as the hole 13 in the bracket and is made of internal and external diameters such as to snugly fit the shank 16 of the side post, and to fill the socket or hole 13 in the bracket before the socket is contracted. The shank can be secured in the socket in any suitable manner, as for instance by a nut 18 screwed on the threaded lower end of the shank below the bottom of the socket so as to draw the side post or support down into the bracket and seat the same firmly upon the top of the cowl, the usual rubber or packing gasket 19 being provided around the shank between the top face of the cowl and the shoulder 20 on the side post. In addition to securing the shank in the bracket by means of the nut 18, the socket of the bracket is contracted by tightening the screws or bolts 15 so as to compress the sleeve or bushing 17 between the shank 16 of the side post and the walls of the socket and thereby cause the sleeve to tightly grip the shank. The side post or support is thus very firmly and securely fastened in the socket or bracket. Nevertheless, the rubber or compressible sleeve or bushing 17 between the shank and the socket permits sufficient movement or give of the lower end of the side post or support relatively to the bracket to prevent breaking of the shank of the post or the bracket, due to the stresses to which the windshield support is subjected in the ordinary use of the automobile.

I claim as my invention:—

1. The combination with a supporting post for the windshield of a vehicle, and a vehicle top fastened to said post, of a fixed bracket to which said post is secured, one of said parts having a contractible socket in which said other part is received and secured, and a yielding body between said socket and said part therein and which is adapted to be compressed against and grip said part by contracting said socket, whereby said post is firmly secured to said bracket but is capable of a limited play with said top relatively to said bracket.

2. The combination with a side support for the windshield of a vehicle, and a vehicle top fastened to the upper end of said support, of a fixed socket in which a part of said side support is received and secured, said socket being contractible, and a yielding body between said socket and said side support and which is adapted to be compressed against and grip said side support by contracting said socket, whereby said side support is firmly secured in said socket but is capable of a limited play with said top relatively to said socket.

3. The combination with a supporting post for the windshield of a vehicle, and a vehicle top fastened to the upper end of the post, of a fixed contractible socket in which the lower end of said post is received and secured, an annular yielding body sleeved on said post in said socket, and means for contracting said socket and compressing said annular body about said post, whereby said post is firmly secured in said socket but is capable of a limited play with said top relatively to said socket.

4. The combination with a supporting post for the windshield of a vehicle, and a vehicle top to which said post is fastened of a split socket on the body of the vehicle in which the lower end of said post is received, an annular compressible body sleeved on said post in said socket, and means for contracting said socket and compressing said annular body about said post, whereby said post is firmly secured in said socket but is capable of a limited play with the top relatively to said socket.

CHAS. L. SHEPPY.